(12) United States Patent
Makropoulos

(10) Patent No.: US 7,201,192 B2
(45) Date of Patent: Apr. 10, 2007

(54) EXTENDABLE WOODWORKING SYSTEM

(76) Inventor: Dino Makropoulos, 14 Fox Rd., Edison, NJ (US) 08817

(*) Notice: Subject to any disclaimer, the term of this patent is extended or adjusted under 35 U.S.C. 154(b) by 22 days.

(21) Appl. No.: 10/606,255

(22) Filed: Jun. 25, 2003

(65) Prior Publication Data

US 2004/0261903 A1    Dec. 30, 2004

(51) Int. Cl.
  *B25H 1/00* (2006.01)
(52) U.S. Cl. .................. 144/286.5; 144/287; 83/469
(58) Field of Classification Search ........... 83/469, 83/471–471.3, 472, 477, 477.1, 477.2; 269/289 R; 144/1.1, 3.1, 286.5, 287, 286.1
  See application file for complete search history.

(56) References Cited

U.S. PATENT DOCUMENTS

| | | | | |
|---|---|---|---|---|
| 4,516,612 A | * | 5/1985 | Wiley | .................. 144/1.1 |
| 4,566,510 A | * | 1/1986 | Bartlett et al. | ............. 144/48.3 |
| 4,599,927 A | * | 7/1986 | Eccardt et al. | ................ 83/473 |
| 4,969,496 A | * | 11/1990 | Romans | .................... 144/286.1 |
| 5,040,444 A | * | 8/1991 | Shiotani et al. | ............... 83/473 |
| 6,360,797 B1 | * | 3/2002 | Brazell et al. | ........... 144/286.1 |
| 6,595,096 B2 | * | 7/2003 | Ceroll et al. | .................. 83/473 |

\* cited by examiner

*Primary Examiner*—Derris H. Banks
*Assistant Examiner*—Shelley Self

(57) ABSTRACT

A horizontal portable miter panel saw system that is capable of utilizing a wide range of power hand tools and processing plywood panels and other oversized materials. The apparatus is designed to provide safety, accuracy, mobility, capacity, ease of use, and affordability. Four extendable multi-adjustable legs allow the table to be leveled on almost any surface. An adjustable guide control unit is movable in the x, y, and z planes via a chain drive trolley that allows a tool to make any type of cut accurately and without the need for complex measurements. A plurality of tabletop members form the table top, these are extendable and adjustable to allow for plywood panels to be supported by the table.

7 Claims, 20 Drawing Sheets

EXTENDABLE WOODWORKING SYSTEM

RELATED APPLICATIONS

This application is related to the following co-pending application, the disclosure of which is incorporated in this specification by reference.

U.S. patent application Ser. No. 10/178,156, entitled MULTI-FUNCTION WOODWORKING GUIDE.

FIELD OF THE INVENTION

This invention relates to power tool tables and more particularly, to multi-functional and extendable woodworking power tool tables.

BACKGROUND OF THE INVENTION

Since the introduction of plywood panels to the construction industry, the power tool industry has been trying to find a way of effectively process them. Preexisting tools such as table saws and radial arm saws were not designed for cutting plywood panels. Table saws were often outfitted with makeshift extensions with generally unsatisfactory results. Later, the power tool industry developed a wide variety of table top extensions having various and sundry fences in order to support and process plywood. While some of these devices met with varying success, most proved to be only minor improvements to systems which were never designed to process plywood panels. Almost all of these devices without exception were cumbersome and required extensive space in order to be used.

One such device that was never meant to process plywood panels was the radial arm saw. Radial arm saws in particular are perhaps the worst device to attempt to cut plywood panels, these saws are designed to make small crosscuts, this attribute is evidenced by the support bridge which is at the heart of the radial arm saw design. The power saw portion of the radial arm saw is slidably hung from the support bridge and the travel distance of the saw is limited by length of the bridge. The bridge length is limited due to the bending moment placed on the support bridge by the weight of the saw. Hence the distance the saw can travel is also limited. A serious problem occurs when the radial arm saw is used to cut thin flat sections of plywood. The saw can pose a hazard to the user as well as those nearby because as the saw is extended to the outer most portion of the support bridge there is a tendency for the saw to vertically. This vertical motion adversely affects the cutting action of the saw, as the saw begins to cut the plywood any slight up or down motion may cause the saw to achieve a camming action with the plywood and move or even eject the plywood with sufficient force to cause injury to the operator or someone nearby. This camming action is often referred to in the art as a "kickout" and is commonly associated with the act of attempting to cut plywood with a radial arm saw.

The latest improvement to the radial arm saw is a tool commonly known as a sliding compound saw. Although an improvement over the original radial arm saw, the sliding compound saw suffers from the same problems as its predecessor when confronted with processing plywood panels. Limited capacity, and a tendency to cam on thin stock make the sliding compound saw an inappropriate choice for processing plywood.

A device known as a panel saw was developed for the specific purpose of cutting plywood panels. While panel saws addressed the issues of capacity and safety, panel saws were physically too large and too expensive to be put into practical use by the average carpenter or handyman. Although the panel saw does cut plywood panels, it is not designed to be versatile. The panel saw cannot do something as simple as making an accurate miter cuts.

Over time quick fixes to existing technology have been used in an attempt to process large plywood panels, in many cases these fixes consisted of straight edges or edge guides affixed to the previously mentioned tools. While straight edges and edge guides allowed these tools to cut a section of plywood they have the distinct drawback of excessive set up time. For each cut the user or operator must measure and clamp the straight edge in place.

Tables having power tools within them such as table saws, shaper tables, belt sanding tables and joining or planing tables are well known in the prior art. The use of a table mounted power tool is essential to accurate cutting, sanding, shaping and drilling of materials such as wood, plastic and metal. Typically, each type of power tool requires its own specially made table. For example, a circular saw is mounted into its own specific table to create a table saw; likewise, an electric router is mounted in its own special table to create a router or shaper table. Similarly, electric planers and electric belt sanders also have individual tables dedicated to the individual tool that they are designed for. Each of the tool tables is specific only to that tool that it is designed for. For example, a table saw will only accept a power circular saw to be fitted and mounted into it; the table saw will not allow a router to be mounted in its place. Similarly, a router table will accept only hand held routers, it will not accept circular saws or planers or sanders to be mounted in its place.

The typical modern woodshop has the drawback of limited space. To be versatile modern woodshops normally require several types of power tools and their associated power tool tables. These requirements expose several significant shortcomings in the designs of power tool tables. Because of their large size, power tool tables occupy up a significant amount of space in the woodshop. Similarly with regard to space, the power tool tables often require separate and yet even larger extensions in order for them to accommodate larger pieces of work material. These limitations quickly exhaust the already limited space of the modern woodshop.

Another problem with the average power tool table is that of transportability to a job site. It is often desirable and sometimes even essential to have the accuracy provided by a power tool table at the actual job site location where the work is being done. The difficulty lies in the transportation of the power tool tables to the job site. If, for instance, a job requires the use of a circular saw, a jig saw, a router, a planer, and a sander and their associated tables respectively, clearly, a large truck or other industrial vehicle would be required to move all of the aforesaid tools and their respective tables to the job site. The effort and logistics required to transport and set up these often unwieldy tool tables prohibits their use on the actual job site by otherwise competent craftsmen who do not have the equipment to move a set of tool tables to each job site that they travel to. This disadvantage contributes to a poor quality of workmanship. It is difficult for anyone who has ever worked on a job site to imagine one or even two individuals loading a vehicle with five or six different power tool tables to transport to one job site and then removing those same tables at the end of a days work.

Therefore, there is a need for an extendable woodworking system which functions with a variety of hand held power tools, is extendable to large plywood panels, is versatile enough to make numerous different types of cuts, and is easily transported.

SUMMARY OF THE INVENTION

Briefly described, the invention comprises an extendible woodworking system that is safe, accurate, has a large capacity, easily transportable, easy to use, and affordable. The present invention is all of the above. The extendible woodworking system incorporates a novel tabletop that is both adjustable and extendable to allow for unlimited capacity, thus being able to support panels larger than the size of the table. The present invention further utilizes features such as a highly positionable guide control unit affixed to a movable trolley that securely attaches a tool guide and allows the tool guide to be positioned anywhere at any angle relative to the tabletop to allow for highly accurate cutting. The use of a tool guide enhances the safety of the invention because the user or operator never has to push material into a sharp rotating blade, instead the tool is pushed in a track down and through the material both cutting and clamping the material simultaneously. The unique guide control unit also facilitates the ease of use by allowing the user to align visually the cutting blade (or cutting line if used with a tool guide) with the material. No complex measurements are needed with this inherent visual alignment feature. Further, the unique design of the table allows the table to be disassembled with minimal effort into lightweight component parts that easily fit into the trunk of a standard automobile.

Through the use of different adapter plates, a variety of hand held power tools may be used with a tool guide that is attached to the tool table. Another novel feature of the present invention is that it can facilitate other small portable table tools. The open top design of the table allows a conventional standard portable table saw or other portable table tool to be placed into the tool table when the user is not utilizing the tool guide feature. The integrated open top design of the table turns the tool table into a table saw having an integrated extension table that can accommodate small solid pieces of lumber.

Additional advantages and features of the present invention will become apparent from the following description and the appended claims, taken in conjunction with the accompanied drawings.

BRIEF DESCRIPTION OF THE DRAWINGS

A more complete understanding of the present invention may be obtained from consideration of the following description with the drawings.

DETAILED DESCRIPTION OF THE PREFERRED EMBODIMENT

During the course of this description like numbers will be used to identify like elements according to the different views which illustrate the invention.

Figure 1:
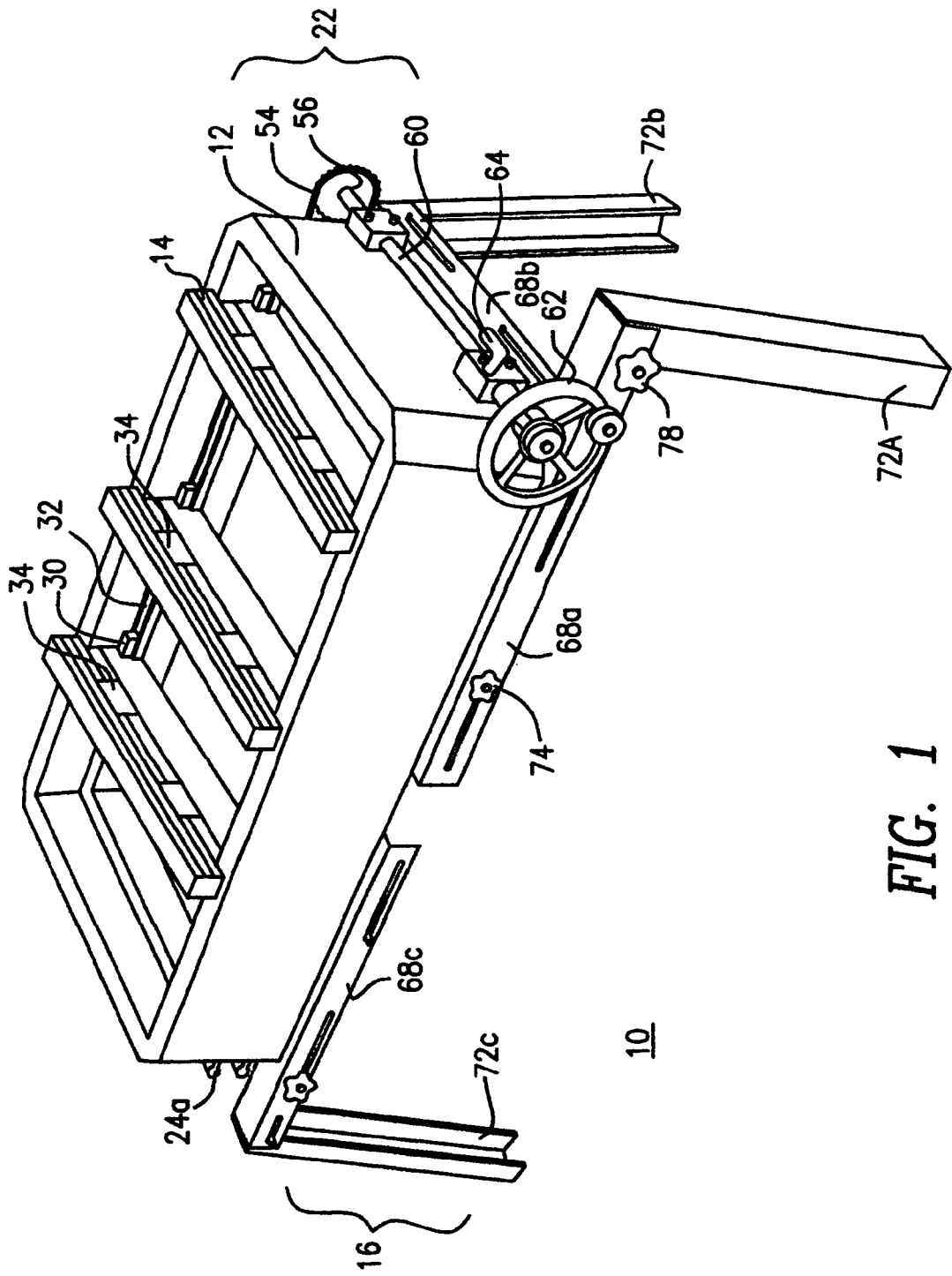
FIG. 1 is a perspective view of an exemplary tool table incorporating various features according to the present invention.
Figure 1A:
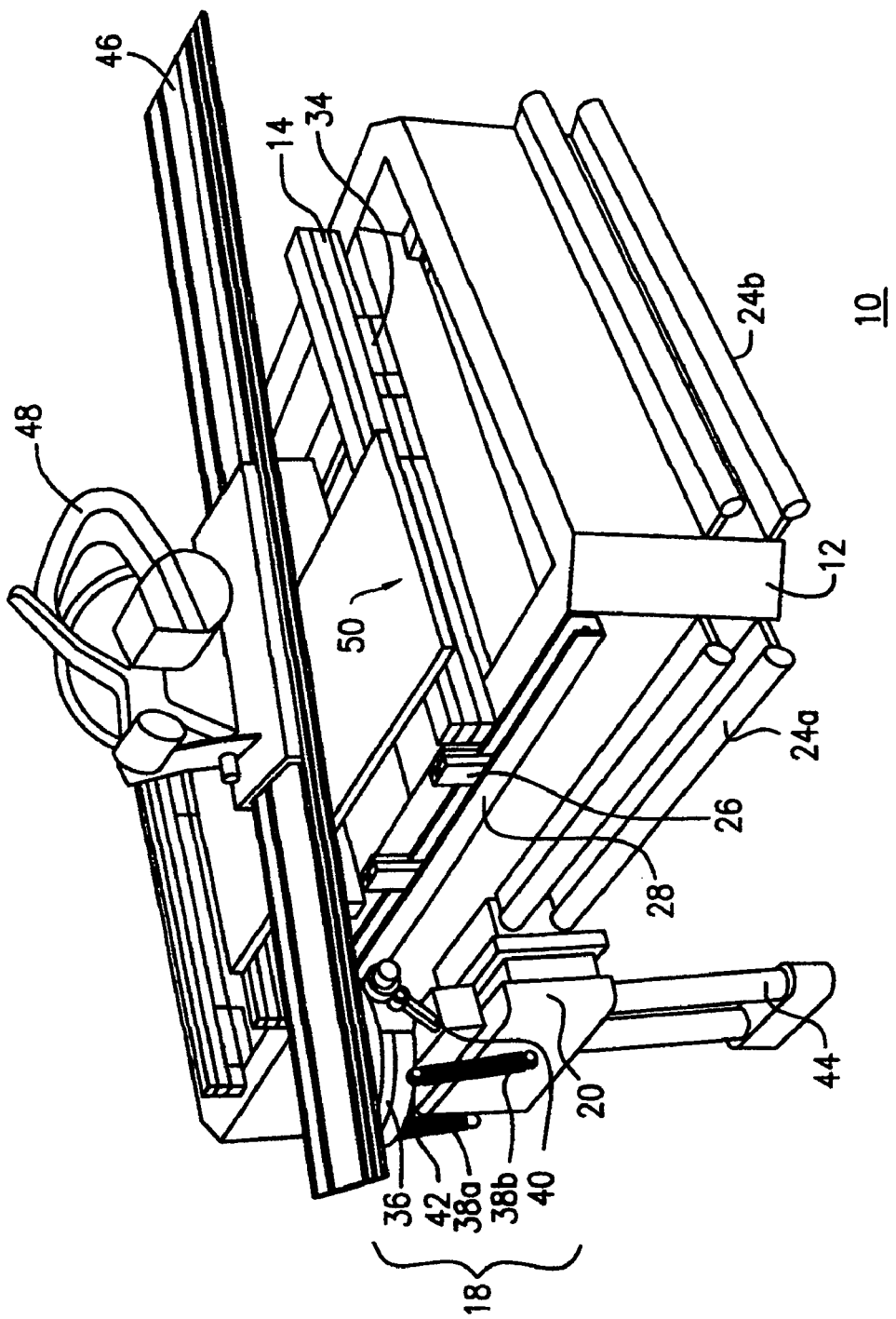
FIG. 1a is a perspective view of an exemplary tool table similar to FIG. 1, further illustrating the extendable legs of the tool table.
Figure 2:
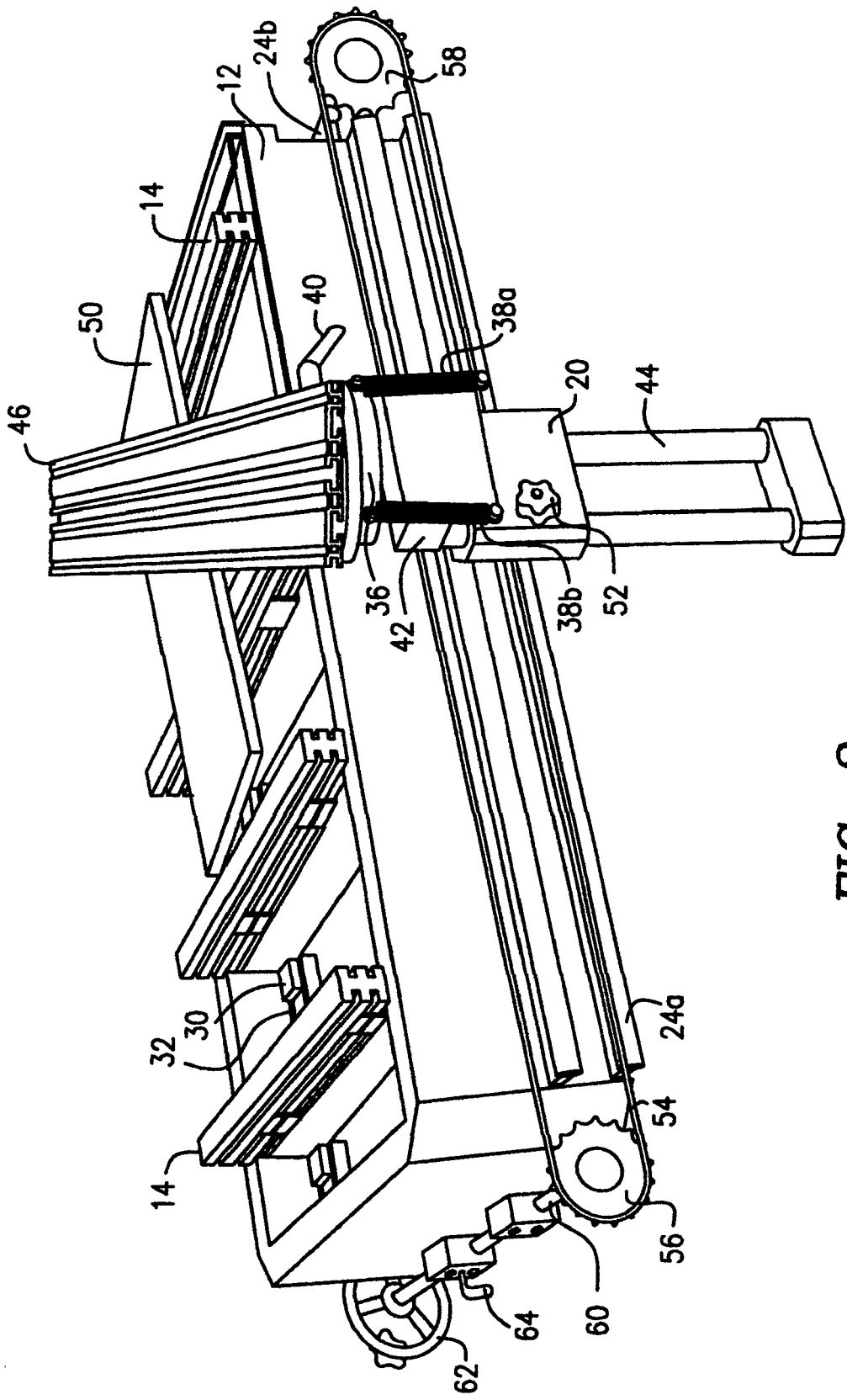
FIG. 2 is a perspective view of the tool table of FIG. 1 shown from a slightly different angle in order to illustrate various features of the present invention.

Referring to the preferred embodiment 10 as illustrated in FIGS. 1–2, shown is a perspective view of an exemplary embodiment of the present invention, an expandable tool table 10 for use with hand held electrical power tools (e.g., such as circular saws, routers, planers, belt sanders, reciprocating saws, and other hand held power tools as well) for cutting and processing all types of materials. Clearly depicted in FIG. 1, a base assembly 12 supports an adjustable tabletop assembly 14 while being supported by a plurality of leg assemblies 16. Referring to FIG. 1a, a guide control unit 18 is hingedly affixed to a trolley assembly 20 which is slidably positionable via a gear assembly 22 as shown in FIG. 1. The trolley assembly 20 rides on a plurality of rails 24a and 24b which are affixed to the sides of the base assembly 12. A plurality of movable workstop assemblies 26 are mounted in a channel 28 affixed to the outside of the base assembly 12. The adjustable tabletop assembly 14 is positionable inside the base assembly 12 through the use of a plurality of adjustable tabletop retainers 30. The adjustable tabletop retainers 30 are slidably seated in channel 32. The channel 32 is disposed along the inner circumference of the base assembly 12. The weight of adjustable tabletop assembly 14 rests on the channel 32. The adjustable tabletop assembly 14 includes a plurality of extension arms that pivot and rotate on a plurality of sliding pivot connectors 34 which also act to retain the adjustable tabletop assembly 14 together as a unit.

The guide control unit 18 is formed of several component parts. These parts include the tool mount head assembly 36, a plurality of springs 38a and 38b, an adjustment lock 40, and a hinge assembly 42. The hinge assembly 42 connects the tool mounting head assembly 36 to the vertical shaft assembly 44. The springs 38a and 38b are connected between the tool mount head assembly 36 and the vertical shaft assembly 44. The spring tension is adjustable by conventional methods commonly known in the art. The guide control unit 18 has a variable height adjustment feature which is facilitated by the vertical shaft assembly 44 that is housed in the trolley assembly 20. As shown in FIG. 1a, a tool guide 46 has been attached to the tool mounting head assembly 36 and a power hand tool 48 is depicted cutting a piece of material 50. This figure depicts clearly how the work piece 50 is supported by the tabletop assembly 14 and how a power tool 48 is employed by the invention to cut the material 50. The vertical height of the guide control unit 18 can be positioned and locked in place by an adjustment lock 52, located on the trolley assembly 20, so that the tool guide 46 lies flat over the work surface 50.

With reference to FIG. 2, the gear assembly 22 is formed of a plurality of parts cooperating in conjunction to create a finely adjustable horizontally moving trolley assembly 20. The gear assembly 22 includes a chain 54, in cooperation with a drive sprocket 56, a return sprocket 58, a drive shaft 60, a hand crank 62, and a shaft adjustment lock 64. Operationally, the chain 54 connects the drive sprocket 56 to the return sprocket 52, notably, the chain 54 is also connected to the trolley assembly 20. The drive shaft 60 connects the drive sprocket 56 to the hand crank 62. Between the hand crank 62 and the drive sprocket 56 a shaft lock 64 is connected to the shaft 60. During use, when hand crank 62 is rotated, shaft 60 rotates as does drive sprocket 56. The rotation of the drive sprocket 56 causes the chain 54 to move in the direction which the hand crank 62 is being rotated. As the chain 54 moves so does the trolley assembly 20 because the trolley assembly 20 is connected to the chain 54. The trolley assembly 20 moves in the direction of the rotation of the hand crank 62. By carefully rotating hand crank 62 it is possible to make fine adjustments to the position of the trolley assembly 20 in relation to the base assembly 12 and the tabletop assembly 14. This fine adjustment feature allows the tool guide 46 to precisely line up a power tool with the material 50.

Figures 3, 3A:
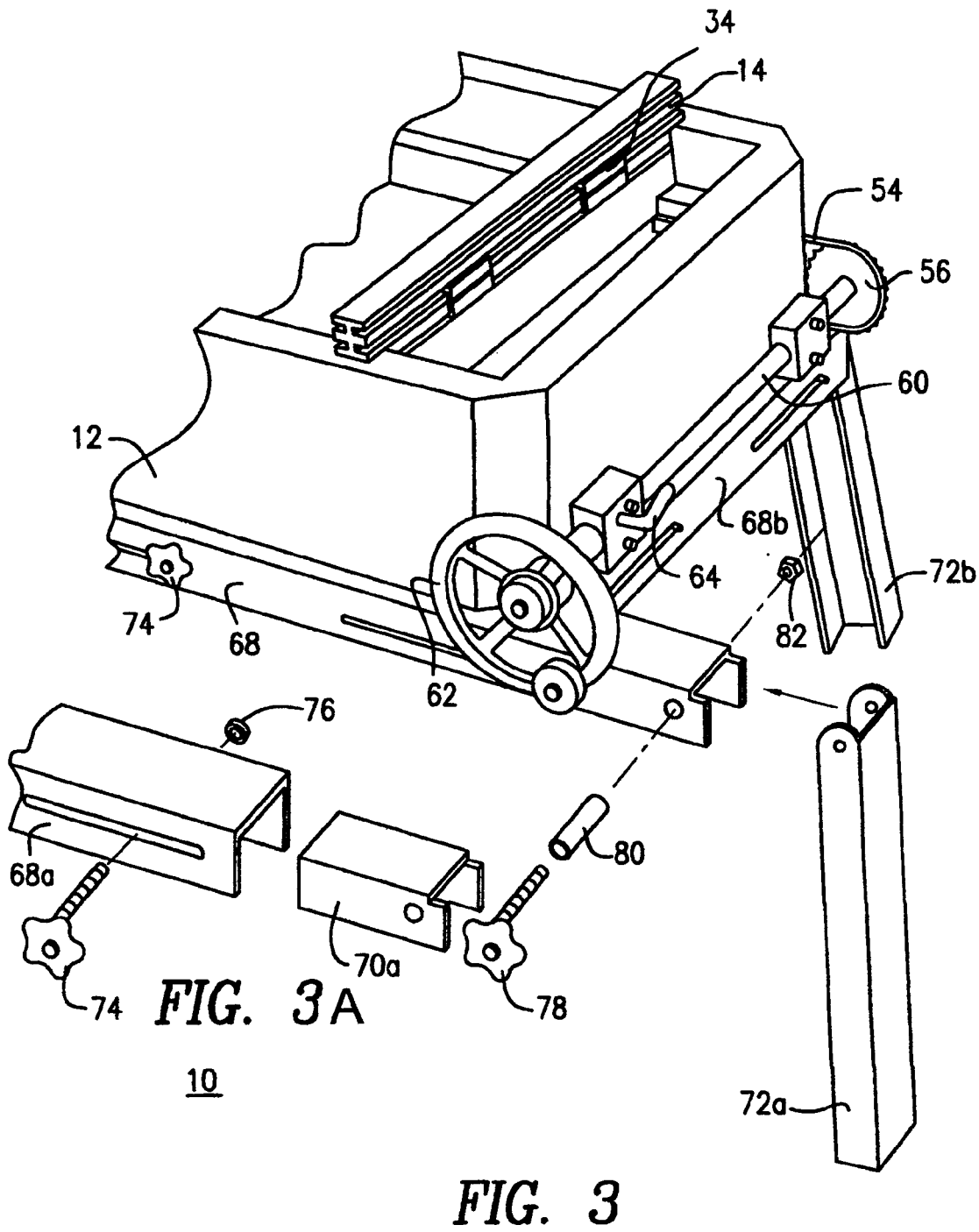
FIG. 3 is a partial exploded perspective view of the tool table.

As shown in FIGS. 3 and 3a, the leg assemblies 16 are formed from a plurality of horizontal and vertical support members connected to one another. The horizontal support members 68a, 68b, 68c, and 68d, are affixed to the base assembly 12. Horizontally telescoping support members 70a, 70b, 70c, and 70d, are slidably connected to horizontal support members 68a through 68d respectively. Vertical support members 72a, 72b, 72c and 72d are connected to the horizontally telescoping support members 70a through 70d respectively. Adjustment knobs 74 allow the telescoping sections 70a–70d to slide out and away from their associated horizontal support members 68a–68d and be affixed in place by friction pressure applied by tightening the adjustment knob 74. While horizontal members 68a–68d are affixed directly to the base assembly 12, horizontal telescoping elements 70a–70d are removably affixed to the horizontal support members 68a–68d respectively. A plurality of vertical adjustment knobs 78 connects the vertical support members 72a–72d to the horizontal telescoping elements 70a–70d.

Again, referring to FIGS. 3 and 3a, the operation of adjustment elements 74, 76, 78, 80 and 82 are as follows: In order to adjust the telescoping feature of horizontal support member 70a, adjustment knob 74 is loosened by rotating the knob counter clockwise and thereby allowing telescoping member 70a to slide in or out of the horizontal support member 68a. The adjustment knob 74 is threaded to nut 76. By rotating the adjustment knob 74 in the clockwise direction, friction pressure is created between adjustment knob 74 and telescoping support member 70a. This friction prevents the telescoping support member 70a from moving. Functioning similarly, adjustment knob 78 is disposed through an end of telescoping support member 70a and passes through the vertical support member 72a terminating in a nut 82 disposed on the opposite side of the telescoping support member 70a. A sleeve 80 is placed over a section of the threaded portion of the knob 78 to protect the threads of the adjustment knob 78 from accidental damage. As with adjustment knob 74, by rotating the adjustment knob 78 clockwise, friction pressure is created and exerted between horizontal telescoping support member 70a and vertical support member 72a preventing vertical support member 72a from moving.

Figure 4:
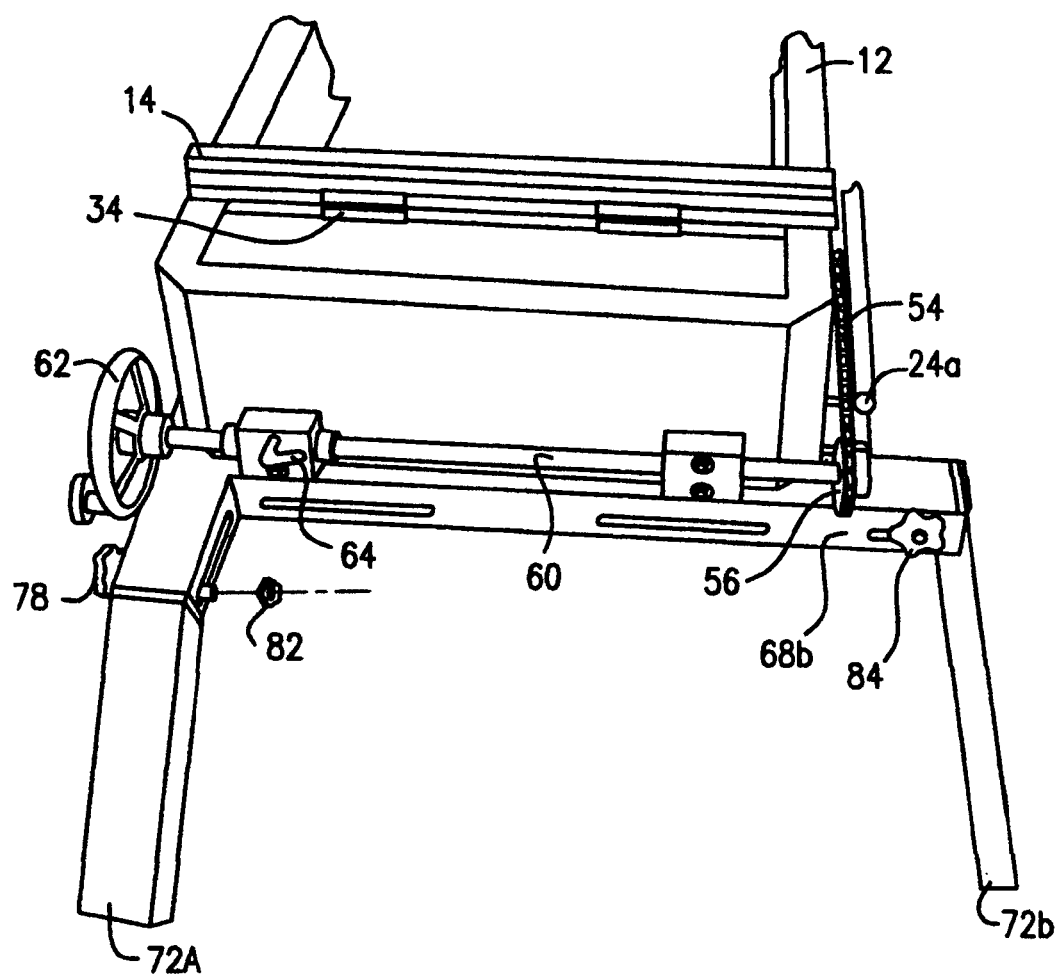
FIG. 4 is a partial perspective view illustrating a side portion of the tool table of FIG. 1.
Figure 4A:
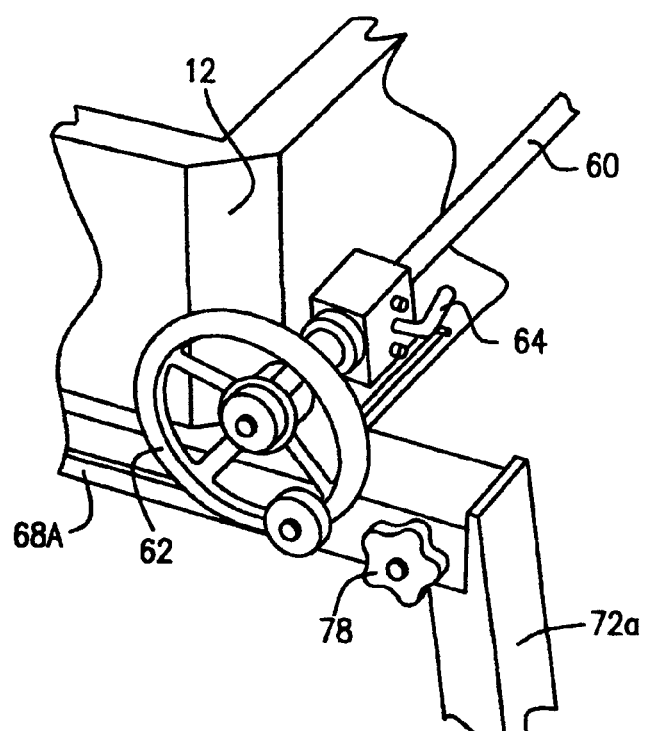
FIG. 4a is a perspective view illustrating a portion of a side of the tool table of FIG. 1.
Figure 4B:
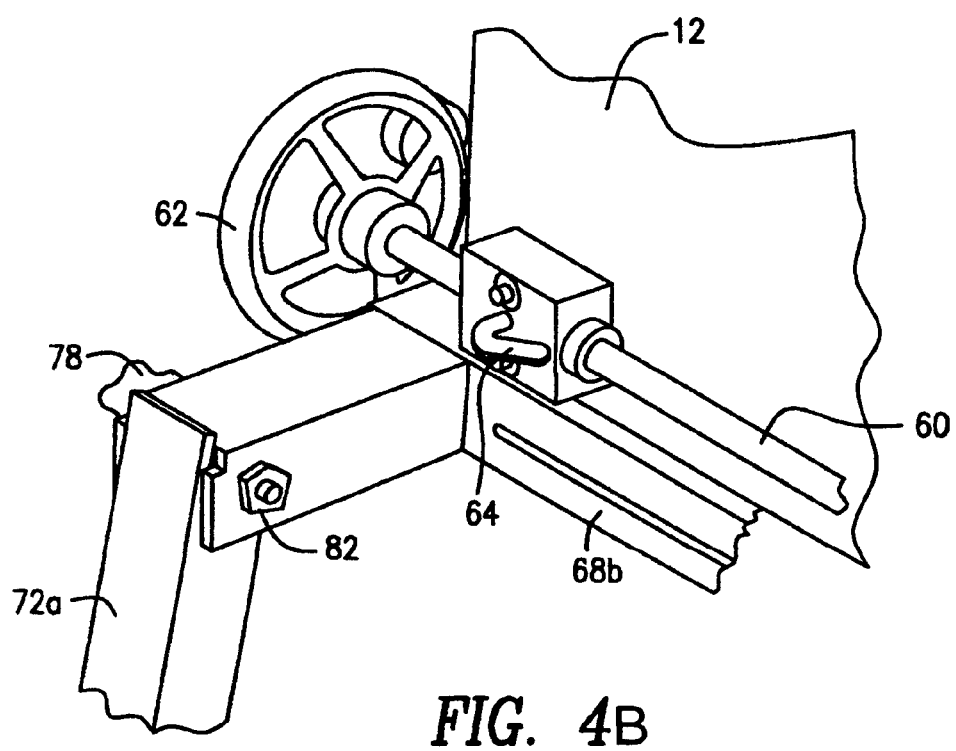
FIG. 4b is a perspective view illustrating a portion of a side of the tool table of FIG. 1.

With reference to FIGS. 4, 4a and 4b, more clearly illustrated is the relationship between the various elements of the leg assembly 16 and the base assembly 12. More specifically, FIG. 4 illustrates the arrangement of the horizontal support members 68a and 68b in relation to the base assembly 12. FIG. 4 also more clearly depicts the elements of the gear assembly 22 and their arrangement to the base assembly 12. Clearly shown are the adjustment elements 78, 82, and 84 of the telescoping horizontal support members of the leg assemblies 16. FIG. 4a more clearly depicts the arrangement of the hand crank 62 to the base assembly 12 as well as the location and arrangement of the shaft lock 64 to the shaft 60. Of further note, as seen in FIG. 4b the arrangement of the mounting method of vertical support member 72a to horizontal telescoping support member 70a. As shown, the adjustment knob 78 is disposed through both the horizontal telescoping support member 70a and the vertical support member 72a and terminates with nut fastener 82. It should also be noted that vertical support member 72a is adjustable with relation to telescoping horizontal support member 70a. This feature allows the vertical support member 72a to be adjusted to a variety of angles in relation to horizontal telescoping support member element 70a. The adjustment feature allows the tool table 10 to be mounted level on a variety of uneven surfaces.

Figure 5:
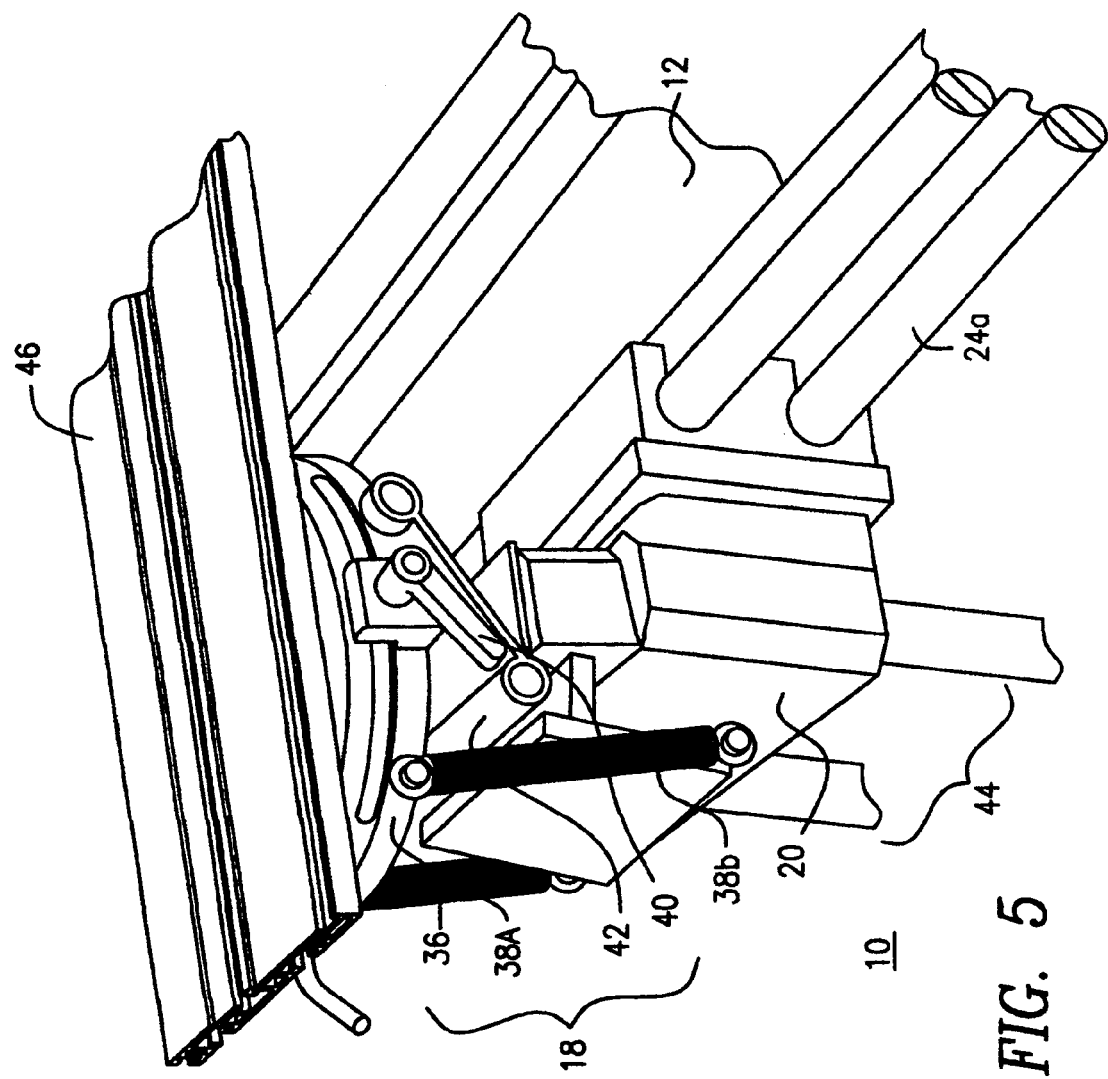
FIG. 5 is a perspective view of the tool table of FIG. 1, illustrating the guide control unit assembly.

Now referring to FIG. 5, depicted are the guide control unit 18, the trolley assembly 20 and the vertical shaft assembly 44. As shown in this illustration, a tool guide 46 has been affixed to the tool mount head assembly 36 of the guide control unit 18. The tool mount head assembly 36 incorporates an upper tool mount plate 36a and a lower tool mount plate 36b in cooperation with each other. The upper plate 36a is rotatably affixed to the lower tool mount plate 36b. The upper and lower plates, 36a and 36b, may be adjusted and locked into position by means of adjustment lock 40. Two springs 38a and 38b are attached between the lower tool mount plate 36b and the vertical shaft assembly 44. A hinge assembly 42 hingedly connects the guide control unit 18 to the vertical shaft assembly 44. In operation, the springs act as a counterbalance to the weight of a hand held power tool (not shown in this figure) placed on the tool guide 46. The vertical shaft assembly 44 is adjustable and allows the guide control unit 18 to be moved up and down vertically in relation to the trolley assembly 20 and the adjustable tabletop assembly 14.

Figure 6:
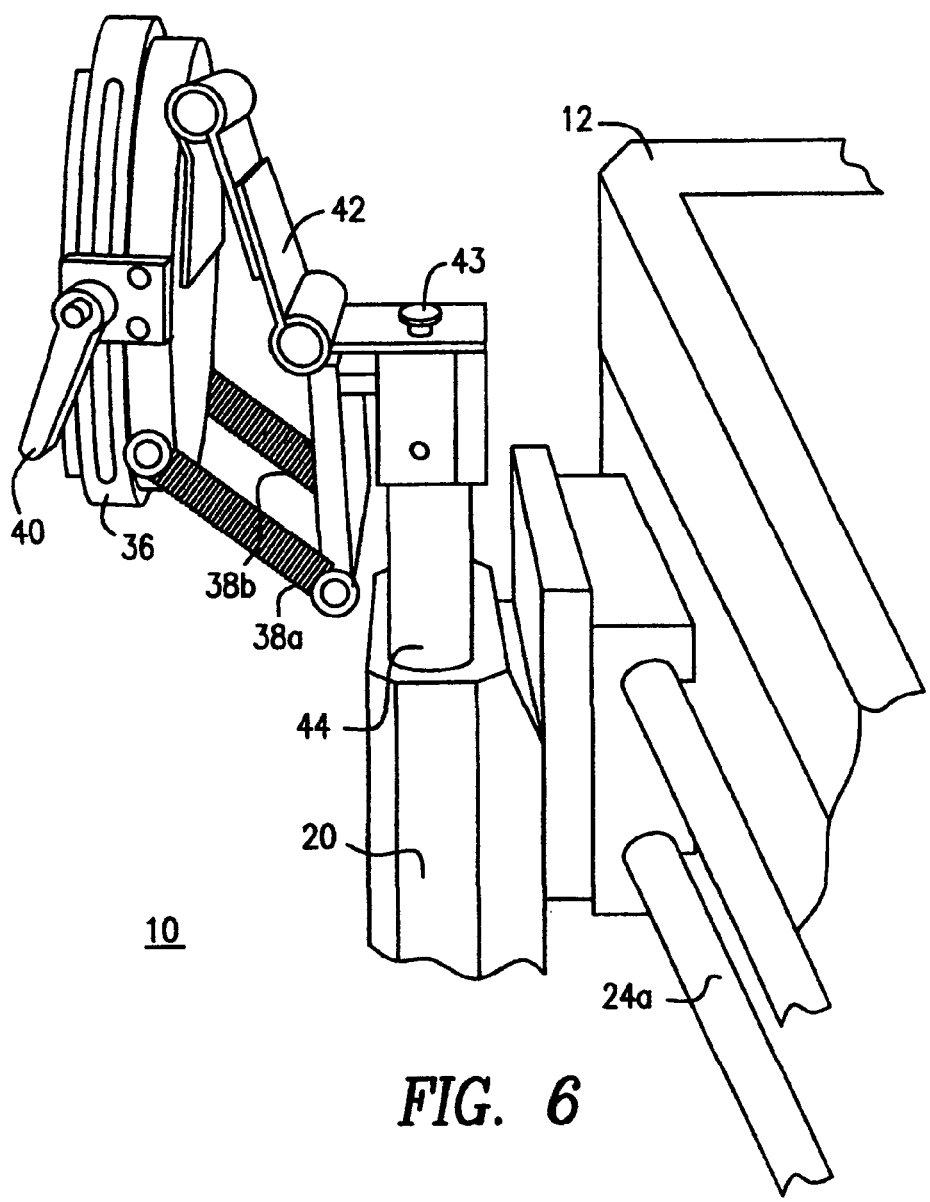
FIG. 6 is a perspective view similar to that of FIG. 5, but illustrating the adjustable features of the guide control unit.
Figure 6A:
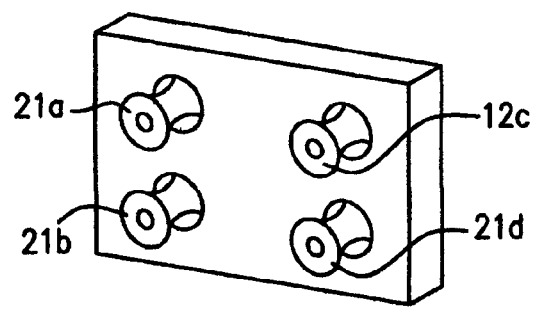
FIG. 6a is a perspective view illustrating the roller portion of the trolley assembly.

Additional features of the trolley assembly 20 and the guide control unit 18 are again more clearly depicted in FIGS. 6 and 6a. An adjustable head stop 43 is mounted between the hinge assembly 42 and the vertical shaft assembly 44. The adjustable head stop 43 allows for fine precision adjustment of the tool mount head assembly 36 such that the height of the tool mount head assembly 36 can be adjusted in relation to the thickness and angle of the material to be worked on. As often occurs, the work material may have an unequal thickness or an unusual shape, the adjustable head stop 43 allows the tool guide 46 to adjust to the unusual angles of the material being worked on. As show in detail in FIG. 6a, the trolley assembly 20 utilizes a plurality of rollers 21a, 21b, 21c, and 21d in order to move back and forth horizontally along rails 24a. The rollers 21a–21d are mounted on top of the rails 24a such that the weight of the trolley assembly 20 and guide control unit 18 are evenly distributed between the rails 24a.

Figure 7:
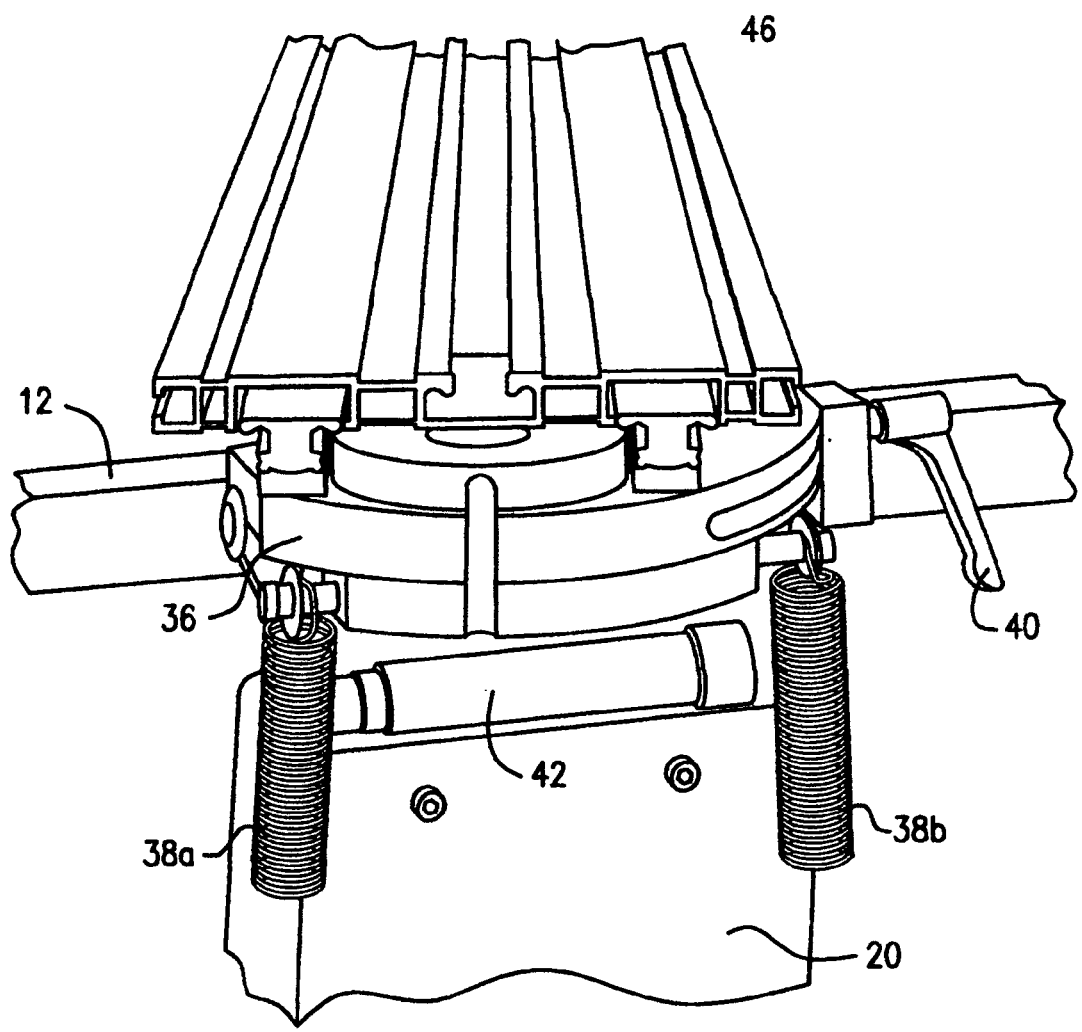
FIG. 7 is a perspective view similar to that of FIG. 5, but illustrating the mounting of a tool guide to the guide control unit.
Figure 8:
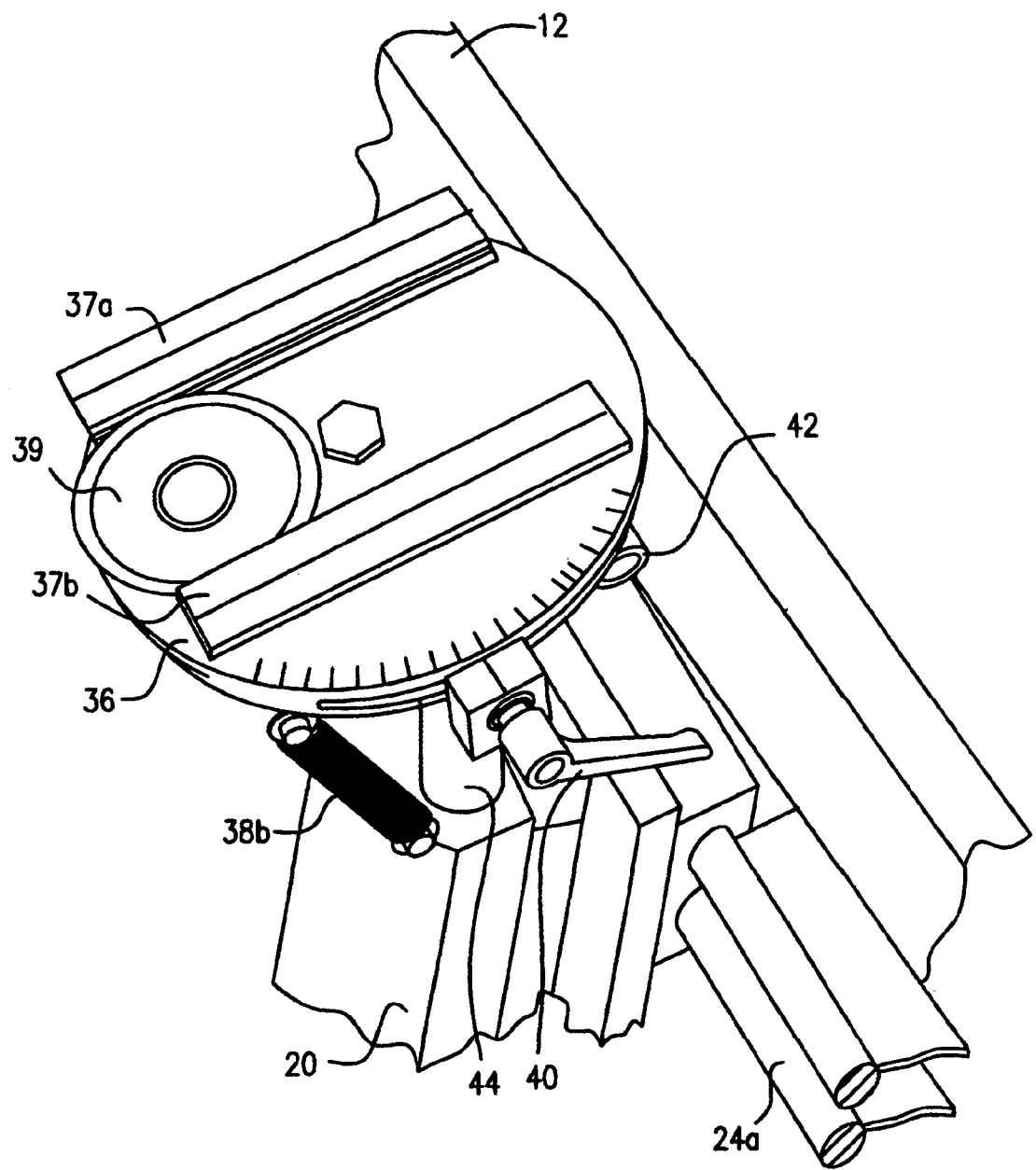
FIG. 8 is a perspective view similar to that of FIG. 5, but illustrating the adjustment and locking features of the guide control unit.

It may be useful for the reader to refer to FIGS. 7 and 8 simultaneously in regard to the following. FIGS. 7 and 8 illustrate the tool guide mounting features of the guide control unit 18. As illustrated, the top portion of the upper tool mount plate 36a has affixed to it tool guide rails 37a and 37b and a cam lock 39. The tool guide rails 37a and 37b are designed to mate with the receiving slots of a tool guide 46 as seen in FIG. 7. The cam lock 39 is rotatably affixed to the upper tool mounting plate 36a and swivels in order to create a friction lock between the surface of the cam lock 39 and the bottom of the tool guide 46. The tool guide 46 is held firmly in place by the upward force exerted by the cam lock 39 and the mechanical lock provided by the tool rail guides 37a and 37b disposed in the channels of the tool guide 46. The cam lock 39 is threaded into the mounting head assembly 36 such that depending upon the direction of the rotation of the cam lock 39, the cam lock 39 will move vertically either up or down in relation to the tool mounting head assembly 36 and provide force against the tool guide 46 in order to prevent its movement. The friction exerted by the cam lock 39 against the tool guide 46 is released by rotating the cam lock 39 counter clockwise in relation to the guide control unit 18.

Figure 9:
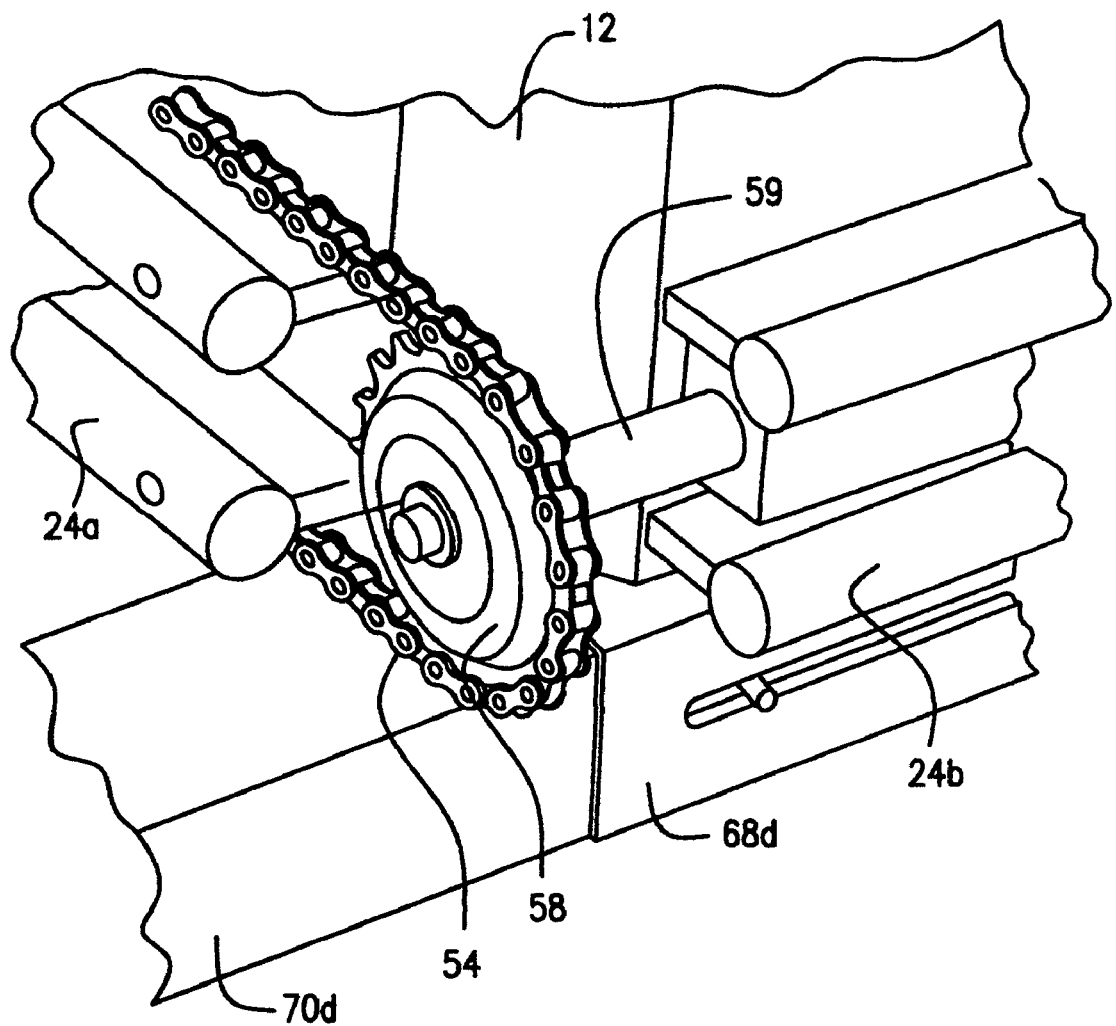
FIG. 9 is a perspective view of a portion of the gear assembly.
Figure 10:
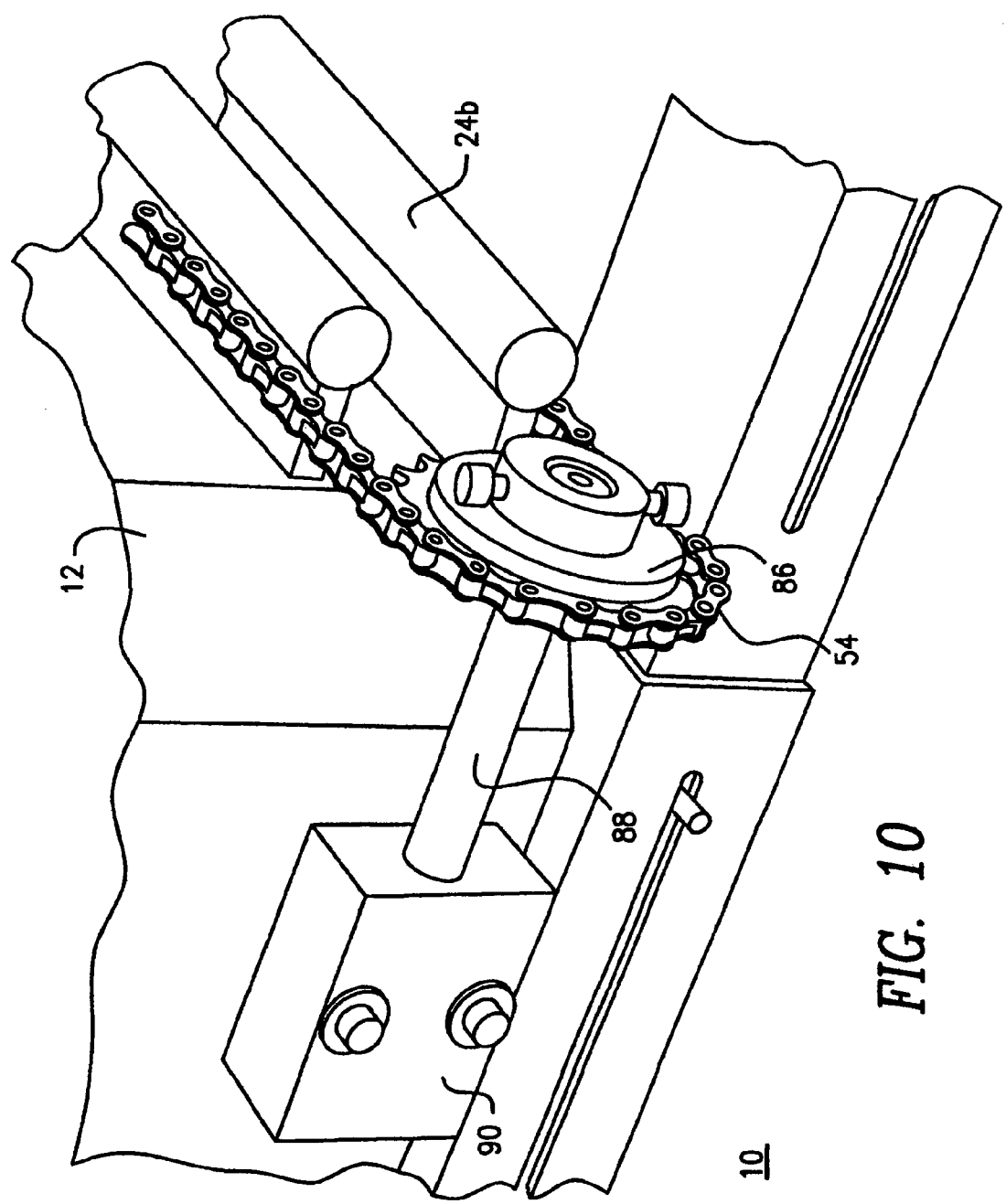
FIG. 10 is a perspective view similar to that of FIG. 9, but illustrating a different portion of the gear assembly.

With reference to FIGS. 9 and 10, a detailed illustration of the sprockets of the gear assembly 22 is depicted. In FIG. 9 the return sprocket 58 is depicted having the chain 54 operatively connected to the return sprocket 58. The return sprocket 58 is rotatably affixed to a shaft 59 which is in turn affixed to the base assembly 12. In the previous illustrations, the trolley assembly 20 rides along rails 24a, however, the gear assembly 22 may be reconfigured such that the trolley assembly 20 may ride along rails 24b. This configuration is depicted in FIG. 10. By removing sprocket 58 and replacing it with sprocket 86 and changing the orientation of the sprockets with respect to the base assembly 12, the gear assembly 22 may be reconfigured to move the trolley assembly 20 along the shorter axis of base assembly 12 on rails 24b. In this configuration, the return sprocket gear 86 is rotatably affixed to shaft 88 which is attached to mounting block 90 which is in turn affixed to base assembly 12. This reconfigurability allows the trolley assembly 20 and the guide control unit 18 to be mounted along either the x or y horizontal axis of the base assembly 12. Furthermore, this allows the tool guide 46 which is mounted to the guide control unit 18 to be oriented to any angle along the x-y axis of the table 10.

Figure 11:
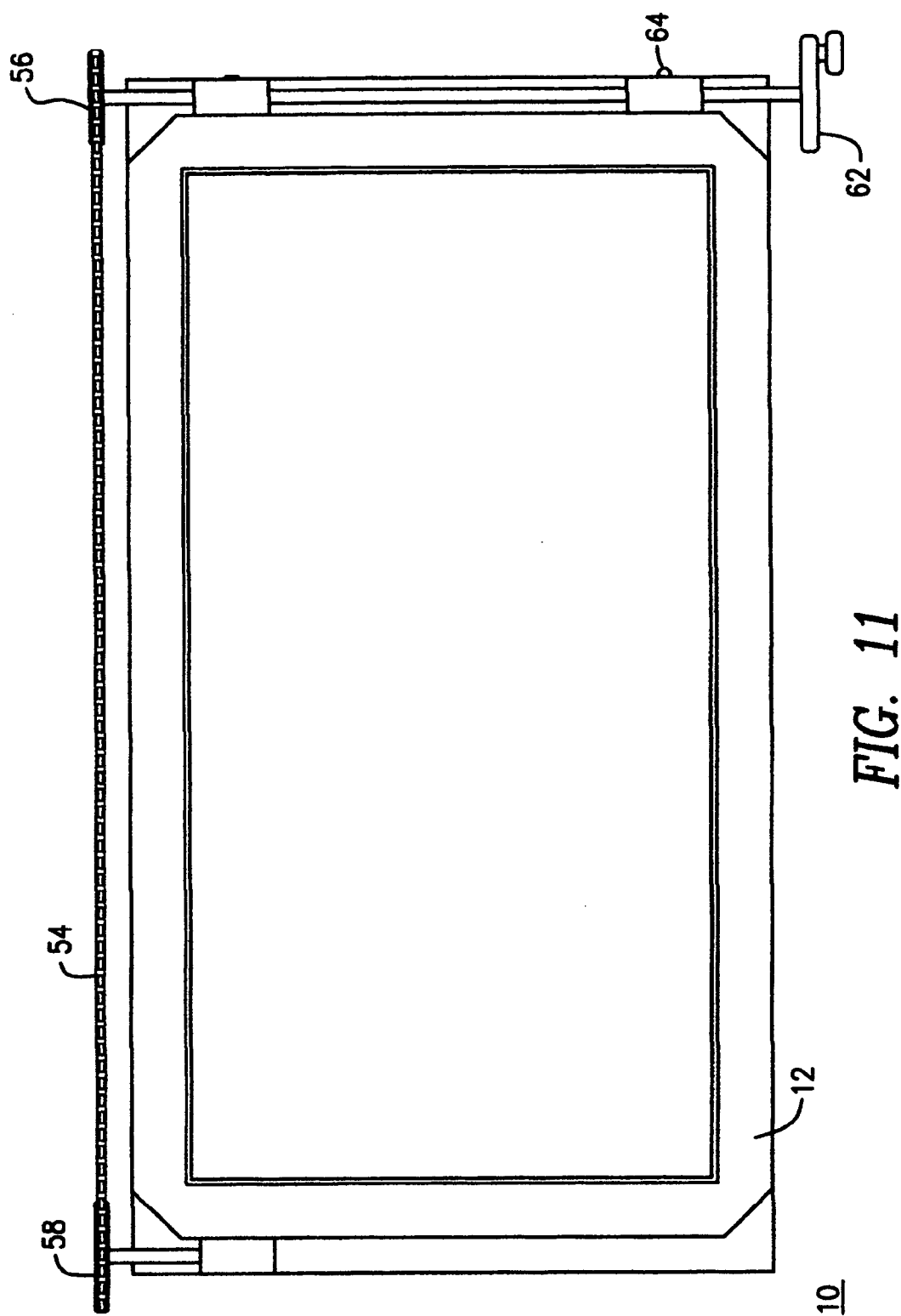
FIG. 11 is an overhead plan view of the tool table.

FIG. 11 is an overhead plan illustration depicting the tool table 10 as seen from above, the x and y axis have been illustrated in order to aid the reader with reference to the previously and following discussion. This illustration clearly shows how the gear assembly 22 is constructed. The drive sprocket 56 is connected to the drive shaft 60 which is in turn connected to a hand crank 62. The chain 54 operatively connects the drive sprocket 56 to the return sprocket 58. The chain 54 acts as a transport mechanism for the trolley assembly 20. For simplicity's sake, the trolley assembly 20 and guide control unit 18 have not been depicted in this figure.

Figure 12:
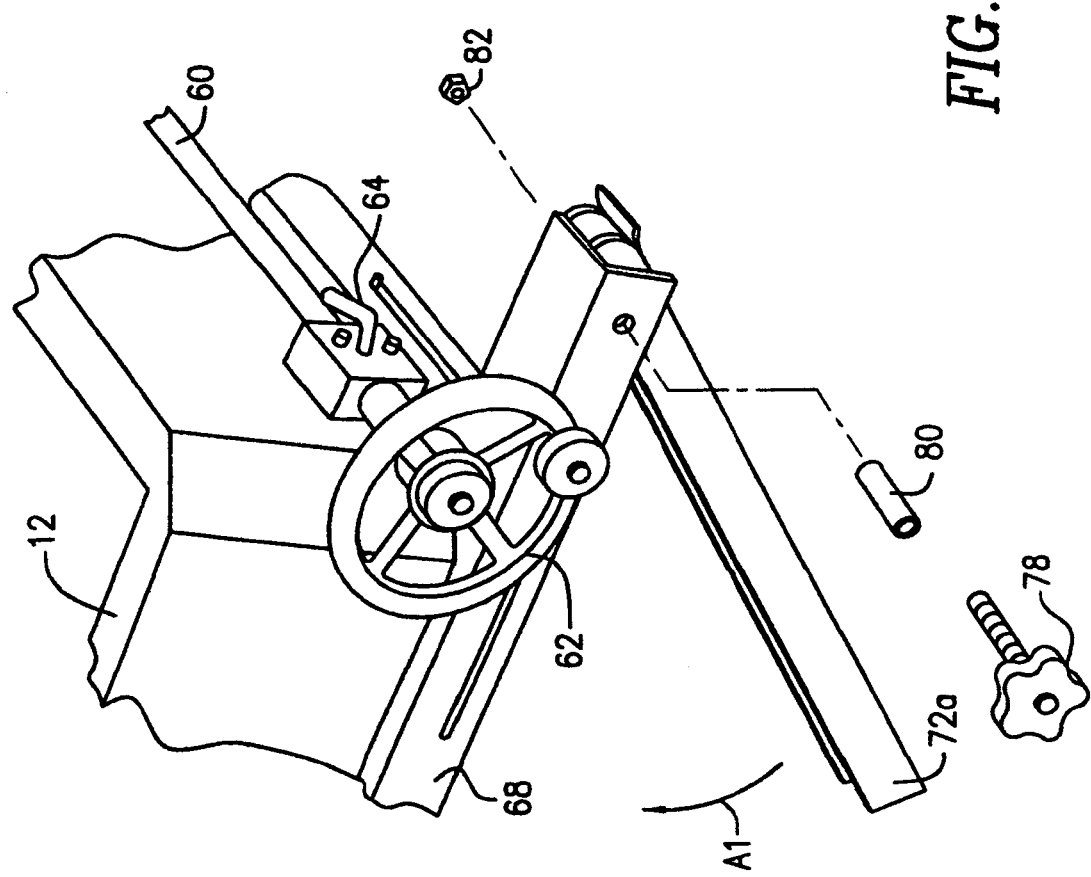
FIG. 12 is a perspective view of a portion of the tool table illustrating the features by which the legs are attached.

The ease of portability of the invention is an important feature and is more clearly shown in FIG. 12. FIG. 12 illustrates how the leg assemblies 16 fold compactly underneath the base assembly 12. Arrow A1 depicts the rotation of vertical support member 72a into the horizontal support member 68a. All of the other vertical support members, 72b, 72c, and 72d have similar folding features to that of 72a. This folding feature allows for easy transportation of the tool table 10. By folding all of the leg assemblies 16, the overall size of the tool table is reduced and a smaller and more compact tool table 10 is created. This folding feature reduces the footprint of the tool table 10 and allows the tool table 10 to fit into a much smaller space. The tool table 10 has been designed such that when all leg assemblies 16 have been retracted and folded, the tool table 10 can fit in a standard automobile trunk.

Figure 13:
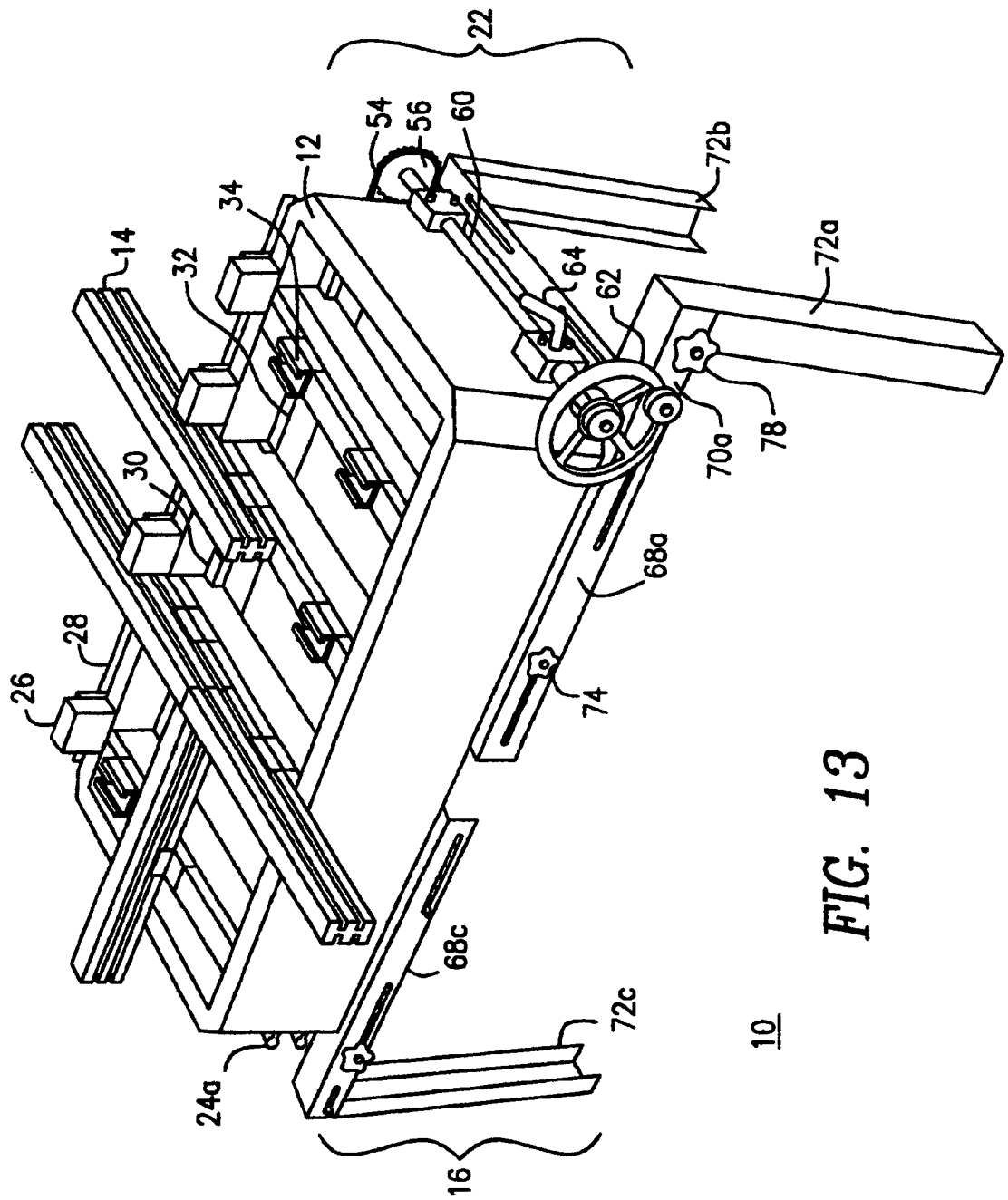
FIG. 13 is a perspective view of the tool table illustrating another configuration of the extendable tabletop.

Referring now to FIG. 13, the versatility of the adjustable tabletop assembly 14 has been illustrated. As depicted, the adjustable tabletop assembly 14 is shown extended and adjusted to accommodate a large section of work material (not shown). The versatility of the extendable sections 14a of the adjustable tabletop assembly 14 become apparent as one notices that the support area of the tool table 10 nearly doubles as the adjustable tabletop extensions 14 are extended in various directions.

It becomes apparent that the size of the work material is almost unlimited. Although the work support area has doubled, the stability of the table is not sacrificed. The extendibility of the leg assemblies 16 provides support regardless of the size of the material being supported.

Figure 14:
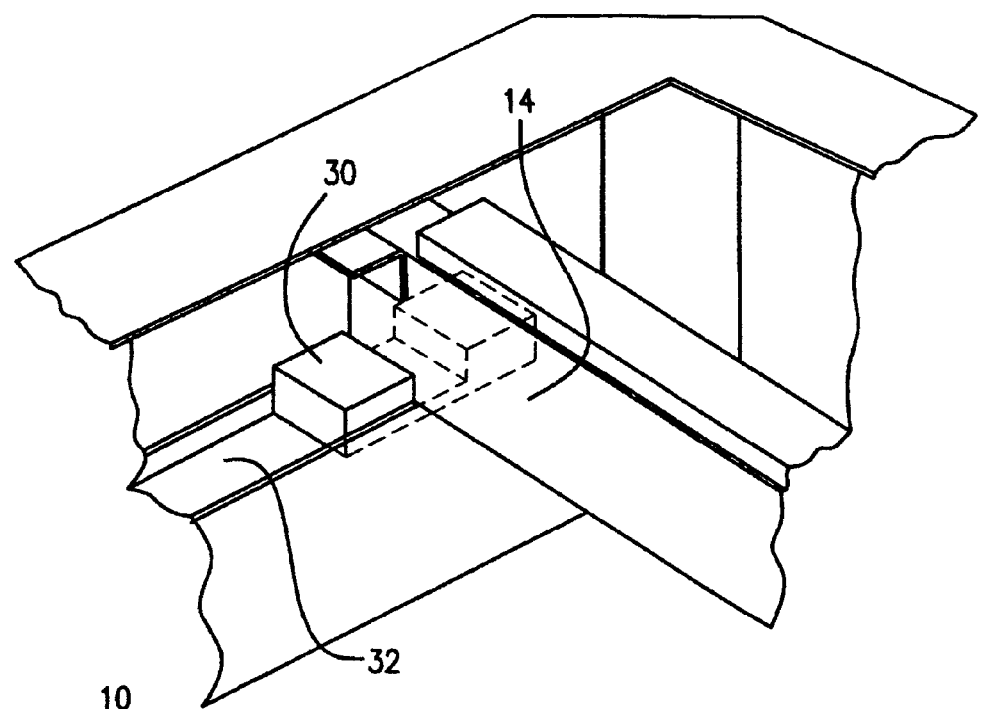
FIG. 14 is a perspective view of a portion of the tool table illustrating the adjustable tabletop mounting features.
Figure 15:
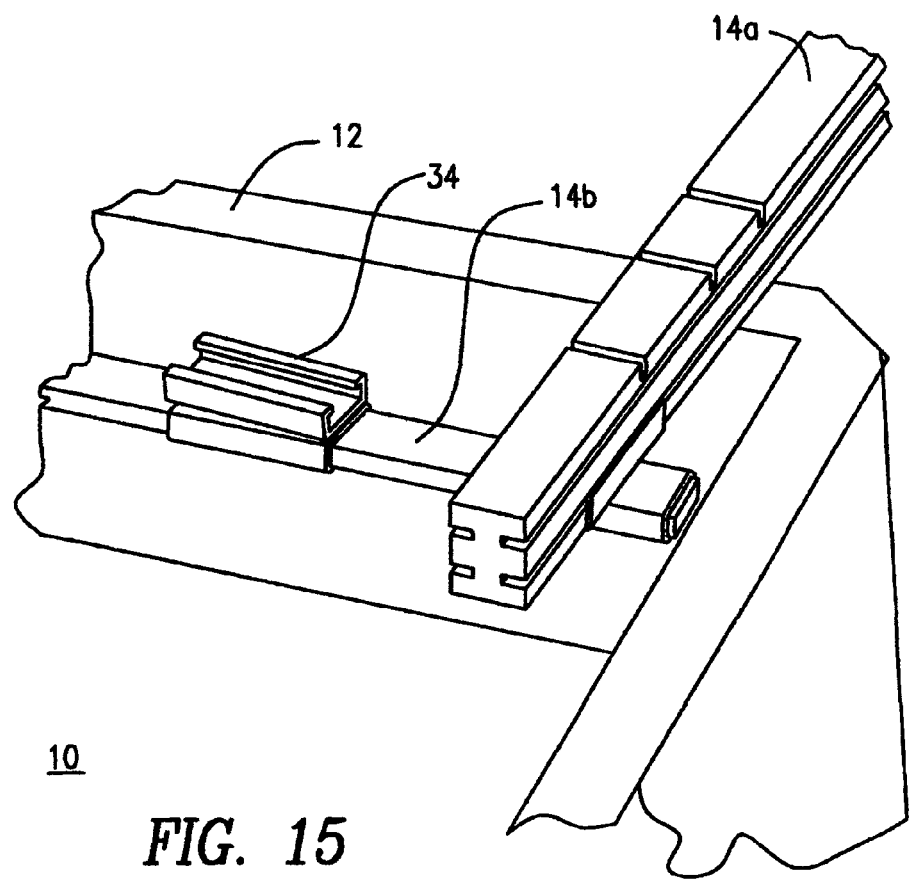
FIG. 15 is a perspective view of a portion of the tool table illustrating the adjustable and extendable features of the tool table.
Figure 16:
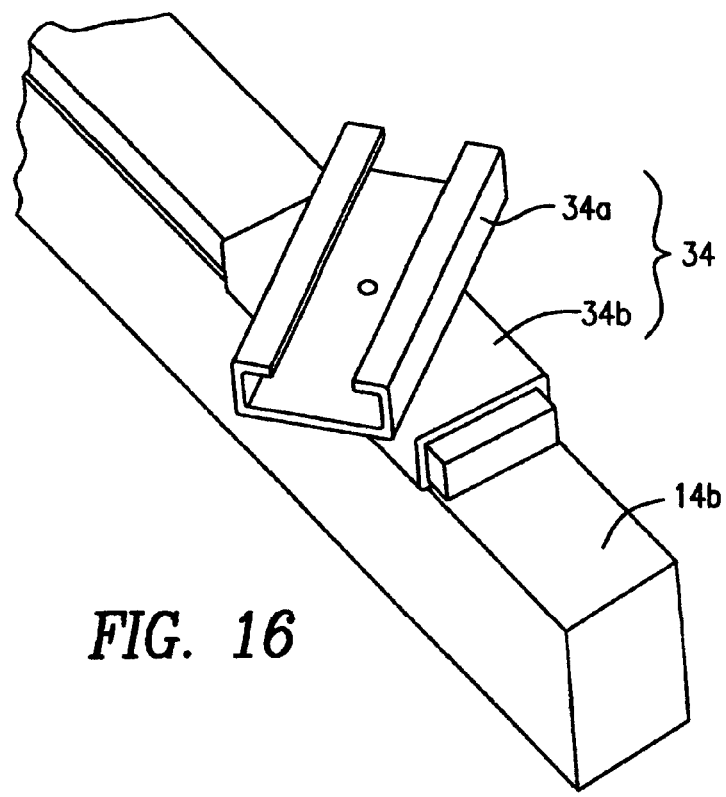
FIG. 16 is a perspective view of the adjustable tabletop features.

The versatility of the adjustable tabletop assembly 14 is more clearly depicted in FIGS. 14, 15, 16, and 17 which should all be viewed simultaneously by the reader for the best understanding of the invention. FIG. 14 depicts how the members of the adjustable tabletop assembly 14 are connected to the base assembly 12. A channel 32 formed along the inside wall of the base assembly 12 holds a plurality of tabletop retainers 30 that allow the adjustable tabletop members 14 to be movably disposed within the base assembly 12. FIG. 15 illustrates the configuration of the sliding pivot connectors 34. As shown, the members of the adjustable tabletop assembly 14 are comprised of 3 separate elements, tabletop upper section 14a, tabletop lower section 14b, and a sliding pivot connector 34 that connects upper tabletop 14a to lower tabletop 14b. The sliding pivot connector 34 is more clearly depicted in FIG. 16.

Figure 17:
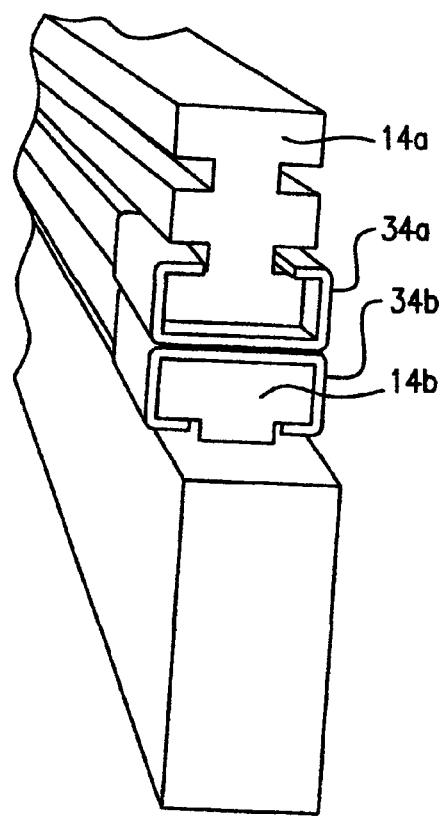
FIG. 17 is a perspective view illustrating the various features of the adjustable tabletop.

The sliding pivot connector 34 is constructed of two elements. The first element is a segment of c-channel 34a. The second element is a similar section of c-channel 34b that has been pivotally affixed, by methods commonly known in the art, to the first segment of c-channel 34a at a relative center point between both segments 34a and 34b. By pivotally affixing c-channel segment 34a to c-channel segment 34b at the relative center point of each of the segments, each c-channel 34a and 34b, may pivot about its center. The c-channel is disposed between the upper and lower segments 14a and 14b, of the adjustable tabletop assembly 14 as depicted in FIG. 17. Further illustrated in FIG. 17, the upper adjustable tabletop segment 14a is formed to mate with the sliding pivot connector 34. Similarly, the lower adjustable tabletop element 14b is also formed to mate with the sliding pivot connector 34. The slidably affixed nature of the upper adjustable tabletop element 14a allows the adjustable tabletop element 14a to be slid or extended and swiveled to any angle necessary to support work material (not shown).

Figure 18A:
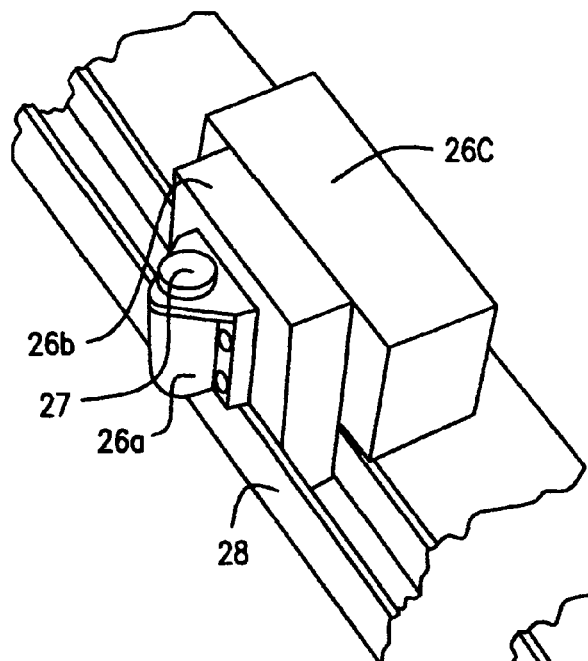
FIGS. 18a–18c are perspective views illustrating the moveable workstop assembly features of the tool table.
Figure 18B:
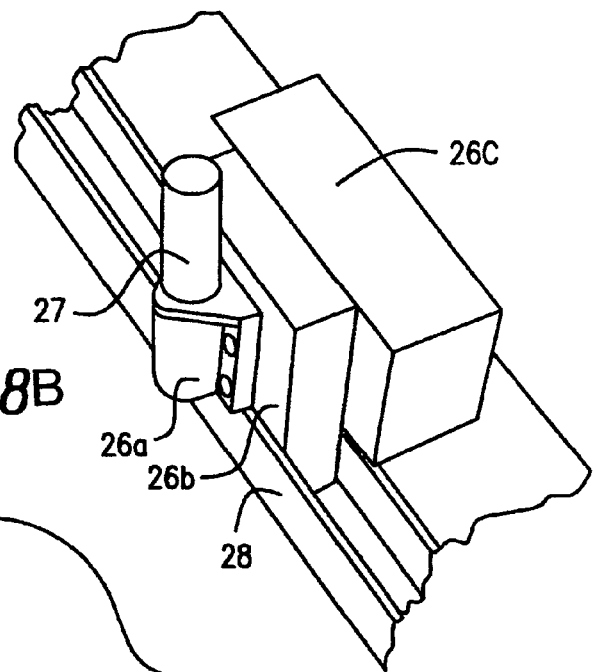
Figure 18C:
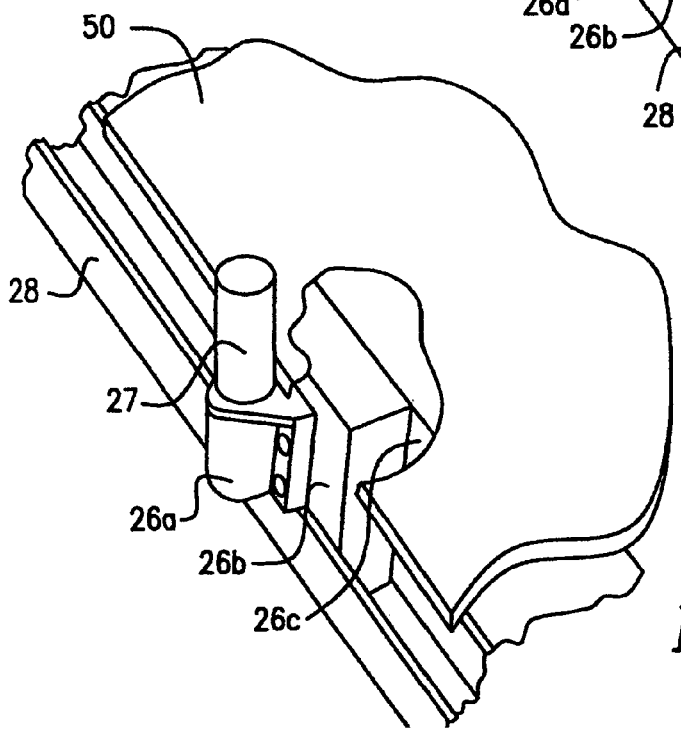

Referring to FIGS. 18a, 18b and 18c, the movable workstop assembly 26 feature of the tool table 10 is illustrated. The movable workstop assembly 26 is mounted in channel 28 to the outside of the base assembly 12. The movable workstop assembly 26 is formed of the workstop housing 26a, the workstop guide 26b, and the workstop material support 26c. A telescoping shaft 27 is also depicted extending vertically from the workstop housing 26a. FIG. 18b clearly depicts the telescoping shaft 27 of the movable workstop assembly 26 in its extended position. FIG. 18c depicts the work stop assembly 26 in. use. As shown, a section of material 50 has been placed on top of the material support 26c portion of the movable workstop assembly 26. The telescoping shaft 27 of the movable workstop assembly 26 is shown extended and preventing the material 50 from moving past the boundaries of the base assembly 12. By bordering the base assembly 12 with a plurality of movable workstop assemblies 26, work material 50 can be prevented from moving while being worked on.

Figure 19A:
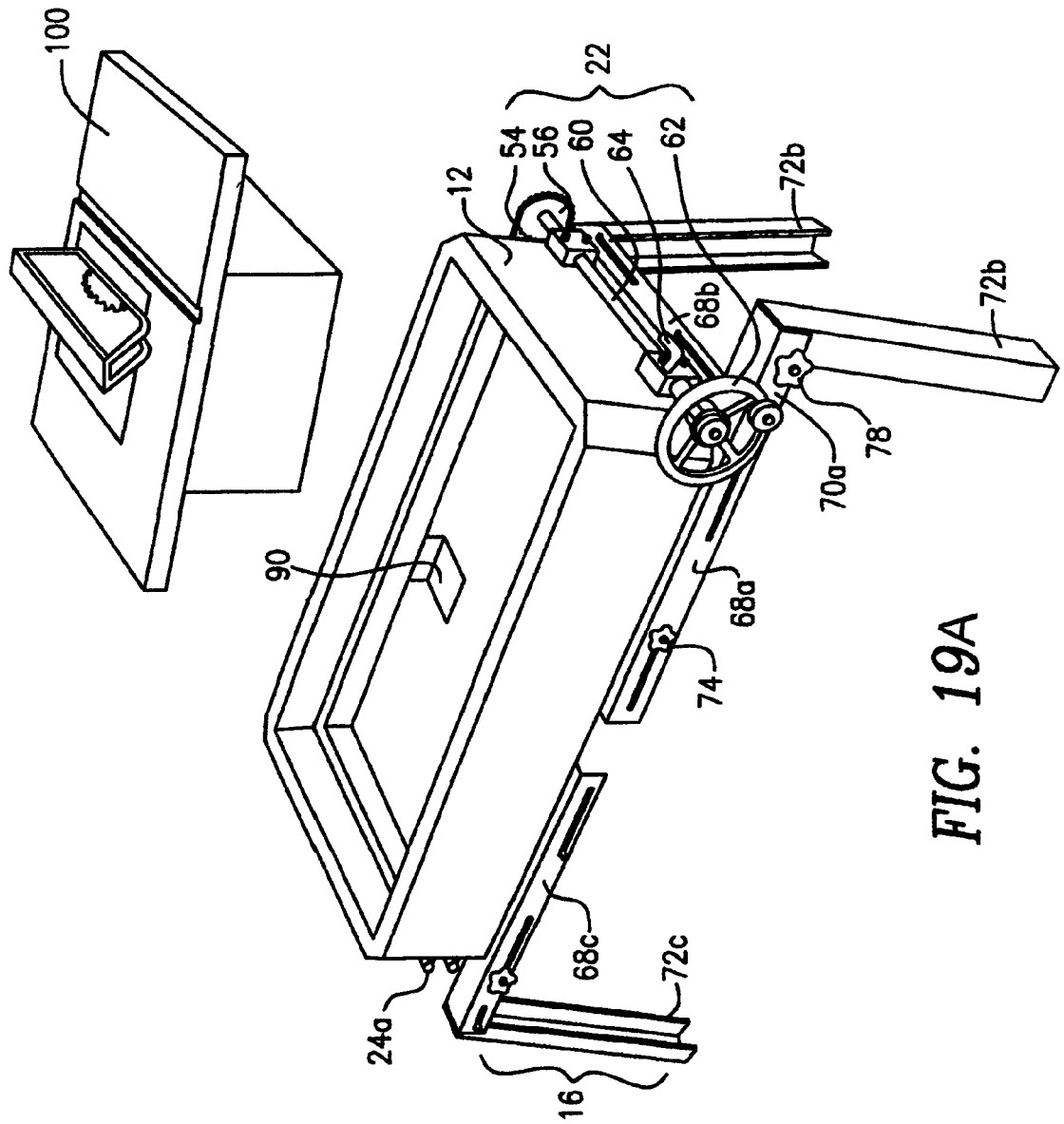
FIGS. 19a–19b are perspective views of invention illustrating the drop-in table saw feature.
Figure 19B:
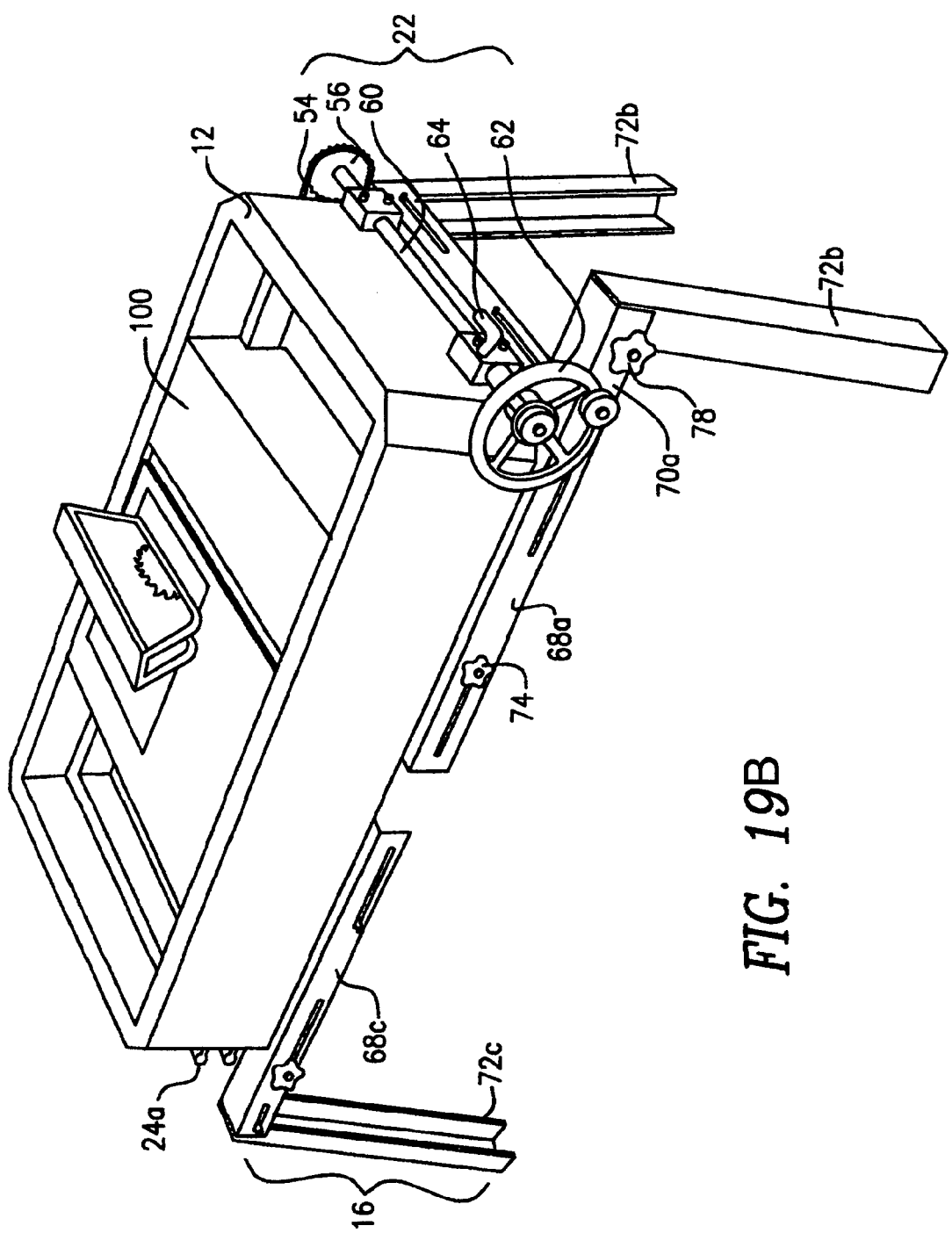

Finally, FIGS. 19a and 19b illustrate the drop-in table saw feature of the invention 10. FIG. 19a depicts a standard table saw 100 located above the base assembly 12 of the tool table 10. This figure illustrates where the table saw 100 will be placed with reference to the tool table 10. FIG. 19b depicts the standard table saw 100 now positioned within the tool table 10. As seen in FIG. 19a, a support bracket 90, disposed inside the base assembly 12, supports the table saw 100 within the tool table 10. This feature which allows the tool table 10 to be configured for use with a standard table saw provides additional versatility to an already multi-faceted invention.

While the invention has been described with reference to the preferred embodiment thereof it would be appreciated by those with ordinary skill in the art that modifications can be made to the structure and elements of the invention without departing from the spirit and scope of the invention as a whole.

What is claimed is:

1. A tool table comprising:

A tabletop assembly;

A base assembly having a plurality of sides forming a substantially rectangular shape operatively connected with the tabletop in order to support the tabletop;

An upper plate and a lower plate pivotally connected to each other to form a guide control unit;

said guide control unit operatively connected with the base;

A plurality of leg assemblies connected to the base;

A portable table tool support bracket connected to the base;

A plurality of extendable work supports connected to the tabletop;

A gear assembly connected to the base in communication with the guide control unit;

A channel disposed within the base assembly;

A hand crank operatively connected to the gear assembly;

A chain operatively connected to both the hand crank and the gear assembly;

A return sprocket operatively connected to the chain, the gear assembly and the hand crank;

A drive sprocket operatively connected to the hand crank and the chain;

An adjustment lock operatively connected between the hand crank and the drive sprocket;

A drive shaft operatively connected between the hand crank and the drive sprocket.

2. The tool table of claim 1, wherein the guide control unit further comprises a hinge assembly.

3. The tool table of claim 2, wherein the guide control unit further comprises at least one adjustable spring connected to the hinge assembly.

4. The tool table of claim 2, wherein the guide control unit further comprises as adjustable vertical stop connected to the hinge assembly.

5. The tool table of claim 2, wherein the guide control unit further comprises tool attachment features located in the hinge assembly.

6. The tool table of claim 2, further comprising a plurality of trolley rails mounted about the circumference of the base.

7. A tool table comprising:

A tabletop assembly;

A base assembly supporting the tabletop assembly;

A tool support assembly removably connected to at least one of the table and the base for supporting a wood working tool so that the tool is above the table;

The tool support assembly comprising a guide control unit, a trolley connected to the guide control unit, a set of trolley rails connected to a least one of the table and the base for supporting the trolley and a gear assembly operationally connected to the trolley; a plurality of legs connected to the base for supporting the base and the tabletop; a tabletop support bracket located within the base for supporting a portable table tool; a plurality of tabletop members operatively connected with the tabletop assembly, the table top members being pivotally connected to the tabletop assembly; a chain connected to the gear assembly and the trolley for moving the trolley along the trolley rails.

* * * * *